No. 860,344. PATENTED JULY 16, 1907.
C. O. TOWNE.
STOP COCK FOR FLEXIBLE TUBES.
APPLICATION FILED FEB. 12, 1907.

Witnesses
J. N. Shumway
C. L. Weed

Charles O. Towne
Inventor

UNITED STATES PATENT OFFICE.

CHARLES O. TOWNE, OF SPRINGFIELD, MASSACHUSETTS, ASSIGNOR TO THE SEAMLESS RUBBER CO., OF NEW HAVEN, CONNECTICUT, A CORPORATION.

STOP-COCK FOR FLEXIBLE TUBES.

No. 860,344.　　　Specification of Letters Patent.　　　Patented July 16, 1907.

Application filed February 12, 1907. Serial No. 357,070.

*To all whom it may concern:*

Be it known that I, CHARLES O. TOWNE, a citizen of the United States, residing at Springfield, in the county of Hampden and State of Massachusetts, have invented a new and useful Improvement in Stop-Cocks for Flexible Tubes; and I do hereby declare the following, when taken in connection with the accompanying drawings and the letters of reference marked thereon, to be a full, clear, and exact description of the same, and which said drawings constitute part of this specification, and represent, in—

Figure 1:
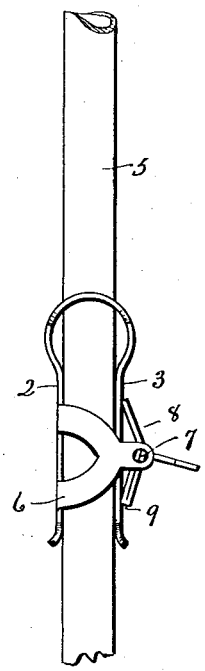
Figure 2:
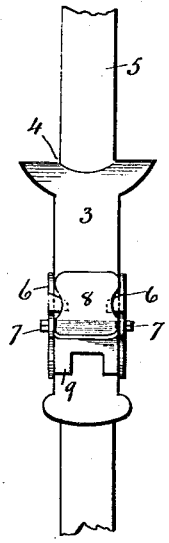
Figure 3:
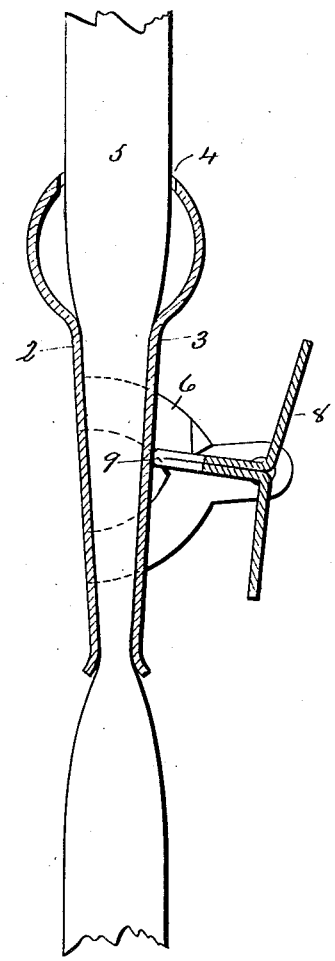
Figure 4:
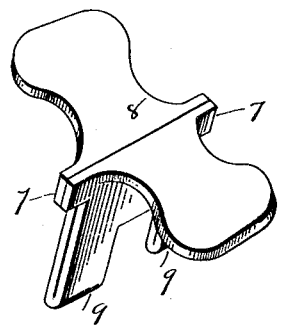

Figure 1 a side view of a stop-cock constructed in accordance with my invention and shown in an open position. Fig. 2 a front view of the same. Fig. 3 a side view partially in section on an enlarged scale and shown in a closed position. Fig. 4 a perspective view of the cam, detached.

This invention relates to an improvement in stop cocks for flexible tubes, such, for instance, as syringe tubes in which it is desirable to control or check the flow of fluid through the tube, the object being to provide a stop cock or check which may be readily turned to an open or closed position by a simple movement of the thumb; and the invention consists in the construction hereinafter described and pointed out in the claims.

In carrying out my invention I employ a frame of substantially usual construction comprising two arms 2, 3, formed from a single piece of metal, the central portion of which has a perforation 4 for the free passage of the tube 5 which extends between the arms 2, 3. The arms 2 are formed on opposite sides with brackets 6 perforated at their upper ends to receive the pintles 7 of the cam 8. Preferably this cam is formed from a single strip of metal doubled upon itself to form a bearing edge 9 which rests upon the outer surface of the arm 3, the ends of the strip being turned outward in opposite directions to form a long thumb piece by which the cam may be turned further to force the arm 3 against the arm 2 so as to contract the tube between them as shown in Fig. 3, or to throw the bearing surface upward to allow the free passage of the tube as in Fig. 1. By thus constructing an operating cam, I provide a simple construction which is readily operated by the thumb of one hand by simply rocking it in one direction or the other, and thus provide a stop cock for flexible tubes which will remain in a closed position without a positive lock and which is easily released.

I claim:—

1. The combination with a frame comprising a perforated central portion and two arms, brackets projecting from one of said arms beyond the other arm, and a cam comprising lugs engaged with the ends of said brackets, an operating edge bearing against the outer face of one of the arms and ends turned forwardly and rearwardly from said operating cam forming a continuous thumb-piece, substantially as described.

2. The herein described stop cock for flexible tubes comprising a perforated central portion and two arms, brackets projecting from one of said arms beyond the other arm, and a cam formed from a single strip of metal doubled upon itself to provide an operating edge, lugs at the sides of said cam for engagement with the outer ends of said brackets, one end of the strip turned forward and the other end turned rearward in substantially the same line to form a continuous thumb-piece extending on opposite sides of said cam, substantially as described.

In testimony whereof, I have signed this specification in the presence of two subscribing witnesses.

CHARLES O. TOWNE.

Witnesses:
JAMES B. SISK,
JOHN D. CASEY.